Sept. 21, 1965   W. G. JOHNSON   3,206,903
HOUSE FRAMING
Filed Oct. 13, 1960   4 Sheets-Sheet 3
*Fig. 8*
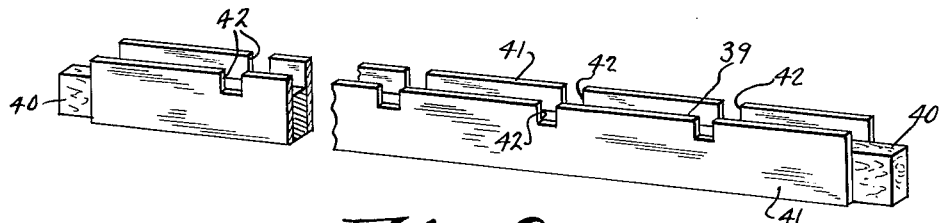
*Fig. 9*
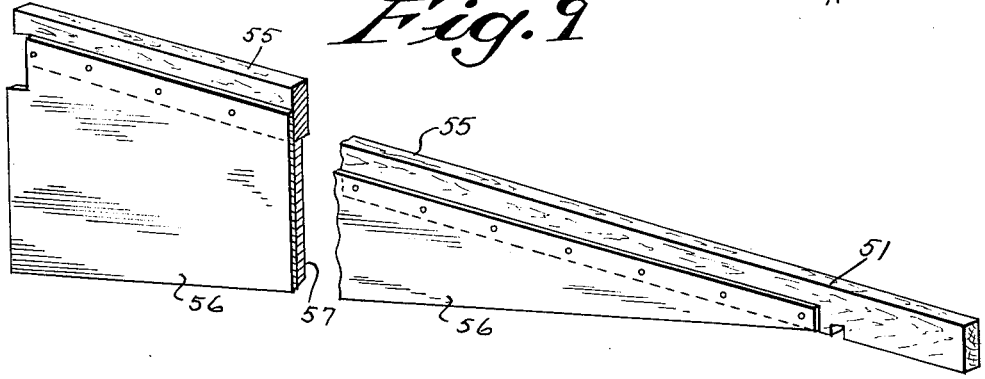
*Fig. 10*
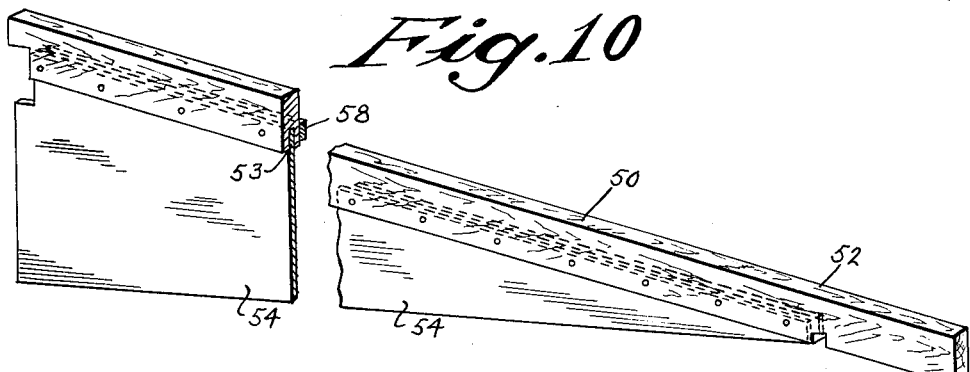
*Fig. 11*   *Fig. 12*
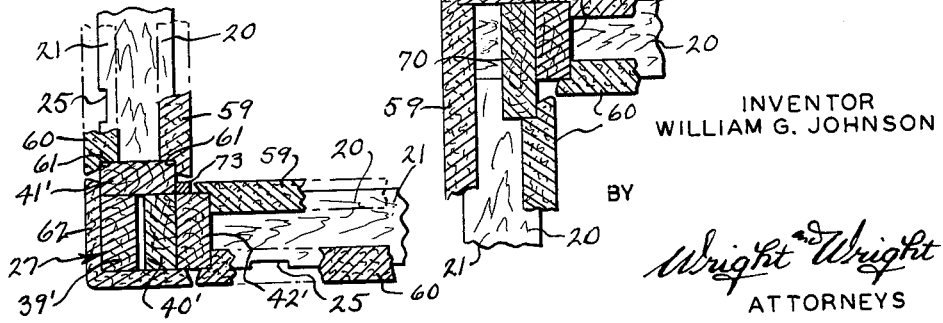
INVENTOR
WILLIAM G. JOHNSON
BY
Wright and Wright
ATTORNEYS

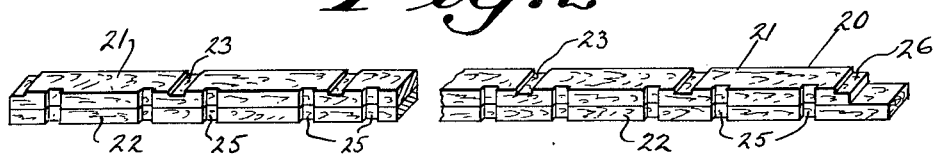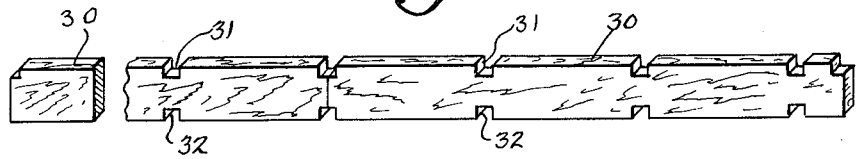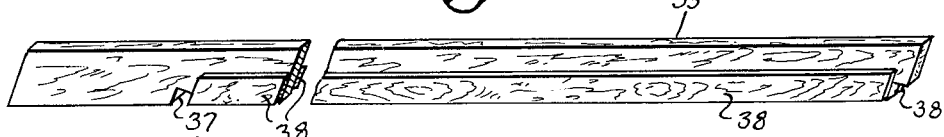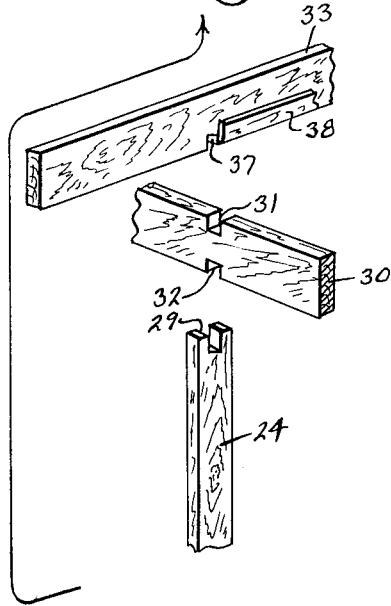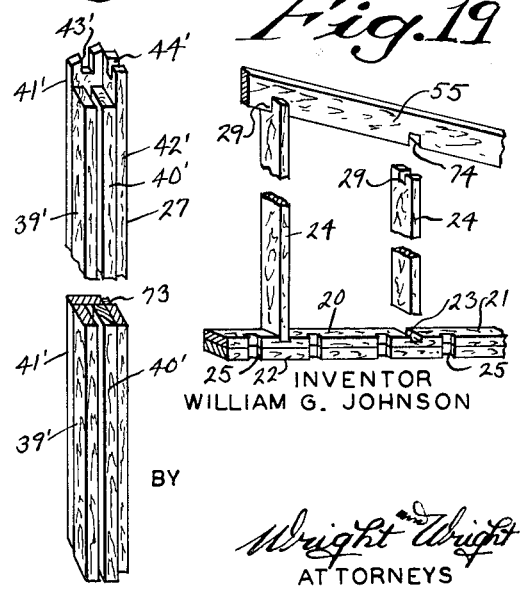

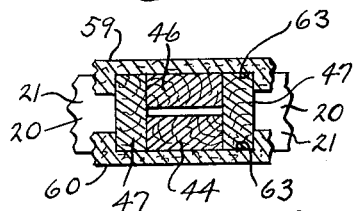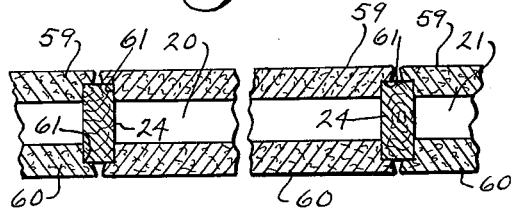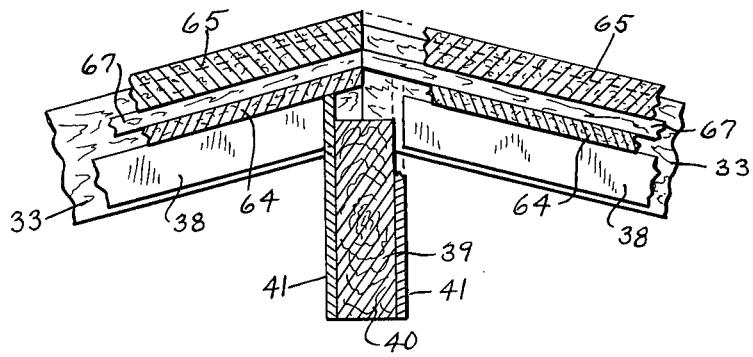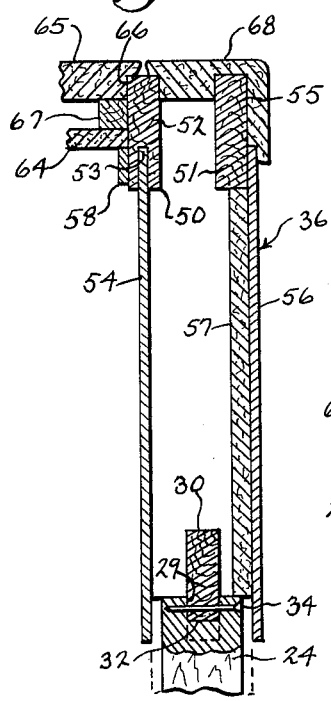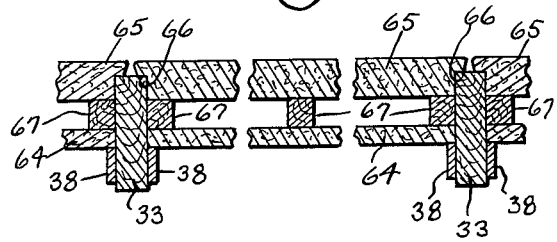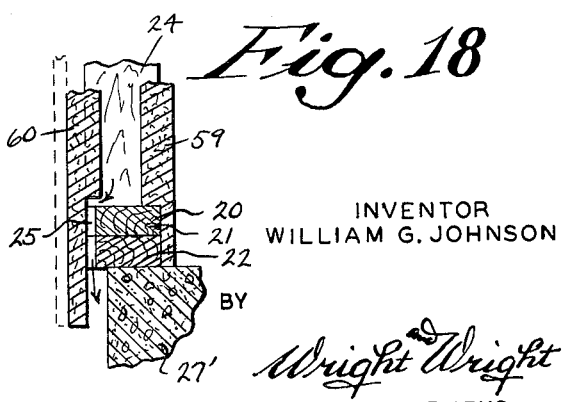
INVENTOR
WILLIAM G. JOHNSON
BY
*Wright & Wright*
ATTORNEYS

United States Patent Office 3,206,903
Patented Sept. 21, 1965

3,206,903
HOUSE FRAMING
William G. Johnson, 210 W. Olive St., Milwaukee, Wis.
Filed Oct. 13, 1960, Ser. No. 62,427
3 Claims. (Cl. 52—648)

This invention appertains to building construction of metal; of rigid insulation board of novel design, and of wood framing; all of novel design, each member of metal, of wood and of insulation board complementing the others to form on a stronger frame, better insulated walls and roofs combining to form a building structure of fewer parts.

In the building art, and more particularly the home building art, structures have been assembled with two methods—conventional and prefabricated. Conventional building structures have the advantage of flexibility and design, but have high labor costs. Prefabrication has the advantage of lower field cost and shorter construction time, but at the expense of flexibilty in materials and design. In actual practice, conventional and prefab construction at low market prices means sacrificing quality of materials, areas of space, and insulation values of soundness of frame.

It is therefore one of the primary objects of my invention to provide means whereby simple building construction components, all of which are designed for streamlined automatic production, fabricated to close tolerances at the minimum factory costs, can be assembled in the field in a shorter time with unskilled labor than prefabricated or conventional construction, retaining for the builder and architect the flexibility of conventional construction and the choice of materials and designs to enhance beauty. With reduced labor costs inherent in the erector system, better quality of materials and finish can be furnished than is now afforded by prefabricated or conventional building structures.

Another salient object of the invention is to provide a frame that can be assembled with or nailed in shear for greater strength, together with provision for expansion and contraction of the complementing components.

A further object of the invention is to provide for low assembly cost with novel design of base plates or sills; studs; top plates; rafters and ridge beam, in order to divide the multiple operations of conventional and prefabricated construction, so that each construction worker handles only one operation in an assembly line production manner, affecting low labor costs in factory and field, in order to afford better and longer life materials.

A further important object of the invention is to provide precision frame components of novel design to enable the structural frame to be completely assembled before nailing, having the nailing operation precede or follow the placement of panels or insulation board components.

Another further important object of the invention is to provide for long life and low building maintenance with a novel design of air space within the walls and roof to insure dry wood frame surfaces for winter and summer heating and cooling.

A most important object of the invention is to provide building components for the do-it-yourself low income, unskilled builder, to enable him to procure mortgage financing not afforded now to an individual, because of the long time lag for construction and finish by prior methods and components.

Another further important object of my invention is the provision of means whereby component parts of the framing of the building, such as foot plates or sills, head plates, end roof trusses, rafters, ridge beam and studs can be built up and precision cut and notched by machinery at a factory whereby the component parts can be readily inter-fitted at a building site to produce a stronger and better building with high insulation qualities, at a low cost.

A still further important object of my invention is to provide a novel wood framing for buildings, built on a modular theory for receiving desired widths of inner and outer insulation board for walls and roof, with the insulation board and the framing combining together to give the desired strong rigid construction with its insulation qualities.

A still further important object of my invention is to provide a novel method and means for forming framing components for a building which can be readily inter-fitted for receiving inner and outer novelly formed insulation board members, the structure being such as to form substantially smooth inner and outer surfaces for receiving outside sheathing and roofing and inside finishing materials, the sheathing, roofing and inside finishing materials being preferably of metal (aluminum) panels or the like with permanent baked enamel finishes.

With these and other objects in view, the invention consists in the novel construction, arrangement and formation of parts, as will be hereinafter described and claimed, and illustrated in the accompanying drawings, in which drawings, FIGURE 1 is a fragmentary perspective view of one corner of a building, showing the use of my novel components for building the desired rugged frame;

FIGURE 2 is a perspective view of a built up foot plate or sill, prefabricated in accordance with my invention;

FIGURE 3 is a detail perspective view of one of the preformed studs;

FIGURE 4 is a perspective view of one of the preformed head plates;

FIGURE 5 is a detail perspective view of one of my preformed roof rafters;

FIGURE 6 is an exploded view showing the inter-fitting of a roof rafter, a head plate and stud, the view being in perspective;

FIGURE 7 is a detail perspective view of one of my prefabricated built up corner posts;

FIGURE 8 is a detail perspective view of my novel prefabricated ridge beam;

FIGURE 9 is a detail perspective view of the outer end roof truss;

FIGURE 10 is a perspective view of my prefabricated inner end roof truss;

FIGURE 11 is a detail horizontal sectional view taken on the line 11—11 of FIGURE 1, showing the built up corner post in the building, the view also showing the use and connection of the insulating board;

FIGURE 12 is a view similar to FIGURE 11 but showing a different form of an angled corner;

FIGURE 13 is a detail horizontal sectional view taken on the line 13—13 of FIGURE 1, illustrating the built up center post with insulation board joined therewith;

FIGURE 14 is a detail horizontal sectional view through the wall construction, the view being taken on the line 14—14 of FIGURE 1, looking in the direction of the arrows;

FIGURE 15 is a detail vertical sectional view through the ridge beam, the view being taken on the line 15—15 of FIGURE 1 looking in the direction of the arrows, the view also showing the inner and outer sections of panels of insulation board connected therewith;

FIGURE 16 is a detail fragmentary vertical sectional view taken on the line 16—16 of FIGURE 1, looking in the direction of the arrows, the view showing the novel end roof truss structure with the insulation board connected therewith;

FIG. 17 is a detail sectional view through the roof construction taken on the line 17—17 of FIG. 1, looking in the direction of the arrows, the view illustrating more particularly the novel connection of the inner and outer sections of insulation board with the roof rafters;

Figure 1:
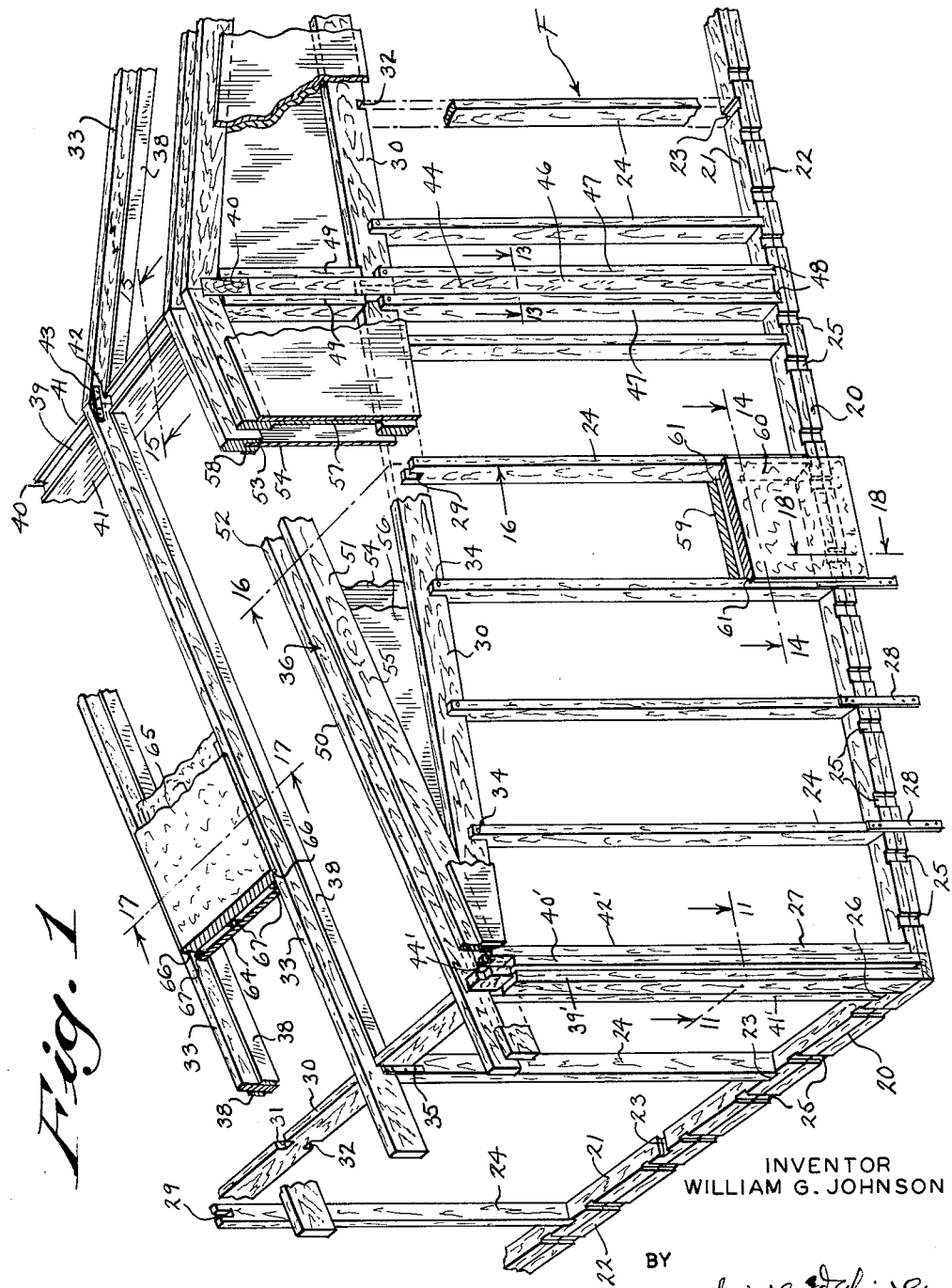

FIG. 18 is a detail fragmentary vertical sectional view taken on the line 18—18 of FIG. 1, looking in the direction of the arrows, the view illustrating the novel drain and breather openings for the walls, and FIG. 19 is a fragmentary detail perspective view showing a preferred arrangement of the studs where head plates are eliminated and where the studs extend from the base plate or sill to the rafter.

Referring to the drawings in detail, wherein similar reference characters designate corresponding parts throughout the several views, the letter F generally indicates my novel framing construction for a building such as a home.

As brought out in the objects of the specification, the framing F is built up of a series of component parts which can be readily machine cut and notched at a factory with certain parts prefabricated, such as end roof trusses, ready for quick assembly on a selected building site.

Thus, the framing F includes built up foot plates or sills 20 formed in any desired running lengths. The foot plates or sills 20 can be, but are not necessarily, formed from upper and lower plates 21 and 22 of the desired width and thickness. As one of the important features of the invention is the modular construction on a basis of sixteen or twenty-four inch uniform spacing, I provide the upper face of the base plate or sill 20 with equidistantly spaced transversely extending notches 23 into which are fitted the lower ends of the studs 24. The outer face of the foot plate 20 at desired spaced points is also notched to provide drain channels 25. The ends of the foot plates are precut to provide stepped shoulders 26 for receiving the lower ends of the built up corner post 27 (see FIG. 1). The sills are laid on and anchored to any preferred type of foundation 27', as suggested in FIGURE 18. If desired, where a concrete foundation or slab 27' is being utilized, strap iron members 28 can be connected to the sills or foot plates 20 at the points of juncture of the studs 24 therewith and these strap iron members 28 can be anchored in the concrete foundation.

The studs 24 are also precut at the factory and all components are cut and notched on precision machinery so as to insure the proper inter-fittting of said components. Each stud at its upper end is notched transversely to provide a seat 29 for the head plates 30. The head plates 30 are preferably in the nature of beams and each head plate is notched at equidistantly spaced points at its upper and lower edges to provide upper and lower seats 31 and 32 for receiving respectively roof rafters 33 and the upper ends of studs 24. The notched portions 32 seat within the upper notched ends 29 of the studs 24 and nails 34 are driven completely through the upper ends of the studs 24 and the head plates 30. It can be seen (see FIG. 16), that the nails are in shear. The rafters 33 fit within the upper seats 31 and these rafters are more specifically set forth and described later in the specification. If desired, however, strap iron connecting members 35 (see FIG. 1) can be utilized for firmly connecting the rafters to the studs. It can also be seen, by referring to FIGURE 1, that the head plates at the ends of the building are not provided with the upper seats or notches 31, in view of the fact that such head plates are connected with the end roof trusses 36.

Each roof rafter 33 adjacent to its outer end is notched, as at 37, for inter-fittting in the upper notches 31 of the top plates 30 for the side walls of the building. Each roof rafter has secured to its opposite sides by glue, nails or the like, longitudinally extending side strips 38. These side strips are preferably flush with the bottom edge of its rafter, but terminate decidedly short of the top edge of its rafter. Each strip extends from the outer notch 37 to a point just short of the upper inner end of its rafter. The strips 38 define shoulders or seats, for a purpose, which will later appear. As the outer ends of the strips 38 terminate at the notch 37, the outer edges of the strips form an admirable shoulder for abutting tight up against the top plate 30. With the strips 38 terminating short of the upper or inner ends of the rafters, the same form means for abuttting against the central ridge beam 39 and the ends of the rafters projecting beyond the strips 38 seat on top of the ridge beam 39. The ridge beam 39 is of a novel construction, as will now be set forth. The ridge beam 39 (see FIG. 8), includes a central beam unit 40 having glued or otherwise secured to its opposite sides, side boards 41. The side boards 41 have their lower edges flush with the bottom edge of the central beam member 40 and the upper edges project above the top face of the central beam member. The side boards 41 are notched at equidistantly spaced points, as at 42, and it is these notches that receive the extended terminals of the rafters 33. The abutting ends of the rafters 33 can be further firmly united by strap irons or the like 43. The ends of the central beam member 40 that project beyond the boards 41 fit on and are firmly seated in the built up central post 44.

Again, the notches 42, 31 and 32 and 23 are all on a certain and same modular scale and in the building of a structure, all of the studs 24 and the rafters 33 are inter-changeable. These all are constructed indentically and can be fitted to any point on the sill or foot plate and the rafters 33 are all constructed identically and can be used at any point throughout the length of the building. The roof of the building is finished off by the end trusses 36 which are in the nature of double roof rafters, as will later appear.

The corner posts 27 are preferably built up structures and each can include facing but slightly spaced post members 39' and 40', which can be in the nature of 2 x 4's, or other properly dimensioned building units. The facing 2 x 4's 39' and 40' are connected by a transversely extending structural member 41, which can also be in the nature of a 2 x 4. The structural member 40' has secured thereto a right-angularly extending member 42' which can also be a 2 x 4. All of the structural members 39', 40', 41', and 42' can be united by glue or nails and attention is called to the fact that the 2 x 4's 41' and 42' extend above the upper ends of the members 39' and 40' and that these extended ends are provided respectively with the notches 43' and 44'. The notch 43' receives the end of a head plate 30 and the notch 44' receives the end of a right-angularly extending head plate or as shown in FIG. 1, the head plate at the end wall of a building. It is also to be noted that the ends of the members 41' and 42' terminate slightly short of the lower ends of the members 39' and 40' and this provides stepped faces and these stepped faces are seated on the stepped shoulders 26 of the bottom plates or sills 20.

A center post 44 is provided for receiving and supporting each end of the ridge beam 33 and for supporting and receiving the end trusses 36. Each central post 44 includes a center member 46 and this member can have secured to its opposite sides, studs 47 which are similar to or the same as studs 24. The center post 46 can be of a built up structure and can be made from two facing but spaced 2 x 4's and these two spaced 2 x 4's are connected by the studs 47. The lower ends of the studs 47 extend below the center member 46 and are received in notches 48 formed in the bottom plate or sill 20. The studs 47 are of the same height as the studs 24 and hence these studs 47 terminate decidely short of the upper end of the central member 45, and the upper ends of the studs 47 are notched to receive the adjacent inner terminals of the end head plates 30. Also secured to the opposite sides of the center member 46 above the studs are side boards 49 which fit on and abut up against the adjacent terminals of the end head plates 30. The boards 49 project above the center member 46 and the projecting ends form a seat therebetween for receiving an outer end of the ridge beam 39.

The end trusses 36 each include inner and outer truss members 50 and 51 and these inner and outer truss members 50 and 51 are a prefabricated unit, but the inner and outer truss members 50 and 51 can be prefabricated together to form a single truss unit. The inner truss member 50 includes a roof rafter 52 having its lower face provided with a groove 53 in which is seated the upper edge of a triangular shaped panel 54 of a desired material. The panel 54 seated in the groove 53 can be secured in place by glue, nails or the like, and the panel terminates short of its rafter 52 so that the rafter can be notched and fitted on top of a side head plate 30. The outer truss member 51 also includes a roof rafter 55 and secured to the outer face of the rafter is a triangular shaped panel 56 formed from the desired material. The panel 56 terminates short of the upper edge of its rafter and is preferably of such a size as to extend down and encompass the end head plate 30 and to cover the upper ends of the studs 24. A section of insulation board 57 is preferably secured to the inner face of the panel 56. It is to be also noted at this time, that the inner face of the rafter 52 of the truss member 50 has secured thereto a strip 58, and this strip 58 terminates short of the upper edge of its rafter 52 so as to provide a seat, for a purpose which will be later set forth. The strip 58 corresponds to the strip 38 carried by the rafter 33. The inner ends of the outer truss members 51 fit over the boards 59 and the ends are notched to seat over the ridge beam 33 and side head plate 30, as best shown in FIGURE 1.

The walls or framing of the walls of the building are completed by using inner and outer panels or sections of insulation boards 59 and 60. The longitudinal edges of the insulation board are rabbeted as at 61, and these rabbeted edges fit against and snugly receive the corners of the studs 24. The insulation board can be secured in place in any desired way, such as nails or the like, and in some instances the meeting edges of the insulation board can be covered by batten strips (not shown).

The insulation boards 59 and 60 form a direct structural part of the building framing and as the inner and outer panels or sections of insulation boards are spaced one from the other, air spaces are provided and hence not only do the boards 59 and 60 form insulation members themselves, but the air space therebetween also brings about a desirable insulating feature.

At the corner posts 27, premolded corner insulation board pieces 62 are provided (see FIG. 11), and this molded angular corner piece of insulation can be secured to the corner post by nails or the like.

The insulation board, panels or sections can be specially formed for receiving the center post 44, and as shown in FIG. 13, the inner faces of the inner and outer insulation boards 59 and 60 are cut away on their inner faces as at 63, so as to fit around the center post.

Now by referring to FIGURE 18, it can be seen that the notches 25 in the sill or bottom plate 20 communicate with the space between the inner and outer insulation boards 59 and 60. Thus, should any sweating take place in the walls an adequate drain is provided.

It is preferable to construct the roof framing similar to the side and end walls of the building. Thus, I provide a dual purpose insulation board and ceiling panel 64 which rest on the strips 38 of the rafters 33 and the strips 58 of the trusses 36. Outer insulation board panels 65 are also provided and the longitudinal edges of the insulation board are rabbeted, as at 66, and these rabbeted edges receive the adjacent edges of the rafters 33 or trusses as the case may be. The outer panels of insulation board 65 can be nailed or otherwise secured in place, and in order to insure the proper spacing of the inner and outer panels 64 and 65, and to give a rugged construction, spacing nailing cleats 67 can be interposed between the inner and outer panels and insulation board.

At the ends of the roof I provide specially molded insulation board sections 68 and these sections are of an angle shape in cross-section, and fit around the outer upper edge of the truss section, and it can be seen that the insulation board sections 68 are rabbeted and grooved to fit adjacent parts of the trusses.

In FIG. 12, I have shown one method of forming a built up corner post, indicated by the reference character 69, for a corner or angle of a building where outside walls meet at a direct right angle and this corner post structure preferably includes a main 2 x 6 structure member 70 having secured to one face thereof an inner post member 71 and to its inner edge a post member 72. The members 71 and 72 may be 2 x 4's. The beam member 72 projects beyond the inner face of the central beam member 70 and forms a seat for an inner insulation board panel 59. The member 70 forms a seat for the rabbeted edge of the insulation board panel 60. The member 71 forms a seat for an adjacent inner insulation panel 60. Finishing strips 73 can be utilized at advantageous points should such be preferred.

I lay great stress on the use of the inner and outer insulation board panels for the walls and the roof, in that, the same will give to a certain extent during the expansion and contraction of wood parts.

Again, the inner and outer faces of the wall structures can be finished by inner metal panels preferably aluminum, if such should be desired, and by outer sheathing panels of aluminum, or aluminum clapboards can be used. In fact, any desired outside sheathing can be used. This also applies to the exterior roof materials.

The modular frame provides electrical locations at windows, doors and base plates for switches, outlets etc., which eliminates cutting and patching openings in wall surfaces, thus reducing time of installation of these electrical fixtures.

As the studs 24 are freely interchangeable and modular insulation board is utilized, as well as modular interior and exterior finishing panels, doors and windows can be easily located at desired points, and it is proposed to use packaged doors and windows; i.e., prefabricated frames, windows and doors, so that the windows and doors can be easily positioned in place as units and these frames, windows and doors form the subject matter of additional patent applications to follow.

While I have stressed the use of interior metal aluminum panels with baked on finish, and exterior metal aluminum panels, or sheathing, it is to be understood that the building can be surfaced with all the usual interior and exterior surfaces, such as hard board, plywood, veneer panels, tiling of any kind, etc.

Particular attention is directed to the novel pre-cutting of the timbers to facilitate the firm joining of the various components of the frame and all joints could be glued with packaged glue capsules, if desired, but nailing in shear is preferred.

Great stress is laid on the formation of the walls and the roof with the spaced insulation board to provide the desired air space to form the additional insulation.

The walls and roof form excellent insulation and vapor barriers. In winter, vapor generally travels outward through the walls and roof, and conversely in summer, vapors travel into the walls from the outside. Metal exterior and interior finishing for the walls is desirable since metal and particularly aluminum is the best known vapor barrier which can be bought at a reasonable cost. Obviously, interior and exterior metal finishing material must be spaced and not in contact and hence the air space in the walls and roof effectively accomplishes this purpose.

Great stress is laid on the low cost of buildings constructed in accordance with this invention and all of the components are well suited to automatic line production in factory.

The insulation board on the inside and outside serves as structural members and eliminates the need for crossbracing and the like.

In FIG. 19 I have shown a structure utilized where head plates 30 are eliminated. In this instance, the studs 24 extend from the bottom plate or sill 20 up to the end rafter 55. In this instance the end rafter can be notched, as at 74 to receive the notched upper ends of the studs.

Changes in details may be made without departing from the spirit or the scope of this invention, but what I claim as new is:

1. A modular framing for buildings comprising precision factory precut and notched components for quick interfitting and erection on a building site, said components including a base plate of a predetermined length having equidistantly spaced notched seats on its upper face, a top plate of a predetermined length having equidistantly spaced notches in its upper and lower faces with said notches in direct vertical alignment with the notches in the base plate, a plurality of like studs having their upper ends slotted and interfitted in the notches in the lower face of the top plate and their lower ends fitted in the notches in the base plate, roof rafters supported by the top plate having their lower ends notched and interfitted in the notches in the upper face of the top plate, a ridge beam including a central beam member and outer side board members secured to the central beam member and projecting above the upper edge thereof, the upper edges of the side board members being notched substantially down to the central beam member, the inner ends of said rafters being fitted in the notches in the side board members.

2. A modular framing for buildings as defined in claim 1, and said rafters having side strips secured thereto with said side strips terminating short of the opposite ends of said rafters and said ends of said side strips being in abutting engagement with the top plate and the ridge beam.

3. A modular framing for buildings as defined in claim 2, and said side strips terminating short of the upper edges of the rafters defining seats, inner insulation board fitted on said seats, and outer insulation boards disposed in spaced relation to the inner insulation boards and fitted over the top edges of said rafters.

References Cited by the Examiner

UNITED STATES PATENTS

| | | | |
|---|---|---|---|
| 487,925 | 12/92 | Haring. | |
| 611,309 | 9/98 | Young | 20—2 |
| 724,408 | 3/03 | Horton | 20—2 |
| 788,445 | 4/05 | White | 20—2 |
| 1,156,206 | 10/15 | Brown | 20—6 |
| 1,459,761 | 6/23 | Andrews | 20—2 |
| 1,963,410 | 6/34 | Kartowicz | 20—4 X |
| 2,118,237 | 5/38 | Slayter | 20—1 |
| 2,318,820 | 5/43 | Voigt | 20—1 |
| 2,320,466 | 6/43 | Presley | 20—2 |
| 2,951,311 | 9/60 | Luther | 20—2 X |
| 3,008,195 | 11/61 | Coffey | 20—.5 |

FOREIGN PATENTS 332,070  10/58  Switzerland.

JACOB L. NACKENOFF, *Primary Examiner.*

WILLIAM I. MUSHAKE, *Examiner.*